United States Patent [19]

Liestman et al.

[11] Patent Number: 6,077,602
[45] Date of Patent: Jun. 20, 2000
:::

[54] HEAT SEALABLE FILM

[75] Inventors: David August Liestman, Canandaigua; Dennis Emmett McGee, Penfield, both of N.Y.

[73] Assignee: Mobil Oil Corporation, Fairfax, Va.

[21] Appl. No.: 08/981,947

[22] PCT Filed: Mar. 21, 1996

[86] PCT No.: PCT/US96/03782

§ 371 Date: Nov. 25, 1997

§ 102(e) Date: Nov. 25, 1997

[87] PCT Pub. No.: WO96/38300

PCT Pub. Date: Dec. 5, 1996

[51] Int. Cl.[7] .............................. B32B 5/16; B32B 15/08; B32B 27/00; B32B 27/08

[52] U.S. Cl. ..................... 428/327; 428/331; 428/461; 428/500; 428/515

[58] Field of Search .................................. 428/331, 332, 428/457, 458, 461, 483, 500, 515, 520, 522, 523, 327

[56] References Cited

U.S. PATENT DOCUMENTS

| | | | |
|---|---|---|---|
| 2,795,564 | 6/1957 | Conn et al. | 260/29.6 |
| 3,365,410 | 1/1968 | Wesslau et al. | 260/29.6 |
| 3,753,769 | 8/1973 | Steiner | 117/122 |
| 3,822,175 | 7/1974 | Yuan | 161/93 |
| 4,058,645 | 11/1977 | Steiner | 428/331 |
| 4,058,649 | 11/1977 | Steiner | 428/518 |
| 4,265,948 | 5/1981 | Hayes et al. | 428/35 |
| 4,299,748 | 11/1981 | Hashizume et al. | 260/29.6 |
| 4,403,464 | 9/1983 | Duncan | 53/452 |
| 4,478,972 | 10/1984 | Conrady | 524/388 |
| 4,629,657 | 12/1986 | Gulati et al. | 428/461 |
| 4,695,503 | 9/1987 | Liu et al. | 428/207 |
| 5,017,430 | 5/1991 | Chu et al. | 428/353 |
| 5,093,194 | 3/1992 | Touhsaent et al. | 428/349 |
| 5,268,209 | 12/1993 | Hunt et al. | 428/34.3 |
| 5,486,426 | 1/1996 | McGee et al. | 428/516 |
| 5,567,773 | 10/1996 | McGee et al. | 525/221 |
| 5,843,582 | 12/1998 | McGee | 428/520 |

FOREIGN PATENT DOCUMENTS 1003318   8/1962   United Kingdom .

*Primary Examiner*—Paul Thibodeau
*Assistant Examiner*—Sheeba Ahmed
*Attorney, Agent, or Firm*—Dennis P. Santini

[57] ABSTRACT

A heat sealable thermoplastic film is coated on at least one side with an acrylonitrile-containing coating containing from at least about 25 wt. % acrylonitrile. More specifically the film is coated on a first side with a polymeric coating comprising (i) from about 25 to about 85 wt. % of a nitrile such as acrylonitrile, (ii) from about 40 to about 75 wt. % of a monomer selected from the group consisting of an alkyl acrylate or 1,3-butadiene, and (iii) from about 1 to about 10 wt. % of a monomer selected from the group consisting of an ethylenically unsaturated carboxylic acid or sulfoethyl methacrylate, the coating having a calculated glass transition temperature ($T_g$) of at least about 10° C. In one embodiment, the second side of the film is coated with an acrylic coating composition which is the same or different. In another embodiment, the second side of the film is metallized. The coating on the first side is heat sealable to itself or to the acrylic coating on the second side. In one specific embodiment of the invention, the coating includes a spherical particulate, such as a cross-linked polymonoalkyl siloxane, silica and/or talc.

30 Claims, No Drawings

HEAT SEALABLE FILM

FIELD OF THE INVENTION

This invention relates to a heat sealable film.

Thermoplastic films suitable for packaging products are often required to exhibit a variety of properties, including heat sealability, tensile strength, transparency, machinability and barrier properties.

BACKGROUND OF THE INVENTION

In most processes for packaging products, such as potato chips, nuts, candy, biscuits, spices and similar foods, hardware such as nuts, bolts, screws and nails, the package is formed and filled by creating a heat-seal between two opposed layers of film to form a pocket and almost simultaneously sliding or dropping the product into the pocket. In these form and fill packaging techniques a continuous flat web of packaging film is fed around a form which shapes it into a tube, the tube is slipped over a hollow form and the free edges of the tube are sealed together. The tube so formed is then passed between a pair of hot sealing jaws which create a series of discrete packages by collapsing the film onto itself and forming a seal by the application of heat and pressure. The product is introduced into each package through the hollow form in the interval between the heat seals. During high operating speeds, the product is dropped into the package while the sealing jaws, which form the seal, are closed. With both vertical and horizontal form and fill sealing applications the heat seal should be strong enough to support and retain the product after the sealing jaws open to release the film. It is often desirable to release the sealing jaws soon after the seal is formed so a film which accomplishes this by exhibiting a high "hot tack" is very useful.

Additionally, in packaging applications there is a great demand for heat sealable films which can be subjected to temperatures high enough to seal the films without causing the substrate to cockle or pucker. One approach for achieving this is by coating a film substrate with a layer of heat sealable material which adheres strongly to the substrate and which can be melted at a temperature below the softening temperature of the substrate. Heat-sealable coatings with low melting temperatures are often preferred because the substrate is less likely to be damaged during heat sealing.

In the preparation of films useful for packaging purposes, the outside of the film or the side of the film which comes in direct contact with the hot sealer surfaces should have good hot slip and jaw release characteristics. Additionally, the film should have good machinability so that the wrapped product can be conveyed easily through the overwrapping machine without sticking to adjacent packages or the parts of the machine with which it comes into contact, which can cause production delays. The film should also have barrier properties. Acrylic-containing coatings which offer these properties are known. The acrylic-containing coating is applied to one side of the film substrate and another heat sealable coating, such as polyvinylidene chloride (PVDC), or another acrylic coating, is coated on the other side. Acrylic-containing coating formulations provide the film with a good coefficient of friction which contributes to good machinability characteristics. These acrylic-based coatings also provide the film with good barrier characteristics which improve flavor and aroma protection. Such coatings are described in U.S. Pat. Nos. 4,058,649 and 4,058,645. The PVDC coating or other type of acrylic coating is usually on the inside of the film and provides high seal strength, good hot tack characteristics and barrier properties. These heat sealable coatings have glass transition ("Tg") temperatures which are higher than room temperature. Such a coated film is disclosed in U.S. Pat. No. 4,403,464.

In the film packaging art, materials which can contribute to film damage by causing the film to pucker are often found either in the packaging materials themselves or in the packaged products. It has been found that oriented polypropylene films having acrylic and ethylene-acrylic acid copolymer-containing coatings are sensitive to some types of food additives, for example, the proprietary release agents used in starch based candies. These coatings can also be sensitive to natural oils found in spices such as black pepper, anise and nutmeg. When placed in contact with these aggressive materials, the oriented polypropylene films pucker and deform giving the package a wrinkled and pocked appearance. This can happen within hours of exposure at temperatures above about 29° C. (85° F.) and high humidity (above about 80% relative humidity) or even within two weeks at ambient temperatures and ambient humidity.

One solution to this problem has been to use a polyester film coated with PVDC. The PVDC coating offers moisture barrier properties. These films are useful in packaging starch-based candies, to preserve softness and prevent hardening. The polyester is not affected by the reactive materials used in the products. Significant amounts of PVDC are required for effective barrier properties. However, PVDC contains chlorine, a halogen Halogenated substances have been the subject of environmental concern, and for this reason it is desirable to minimize the use of PVDC in films. Furthermore, polyester films usually have to be laminated to another web, such as polyethylene, for structural integrity (stiffness). This is undesirable because it is an expensive process step and the packaging poses recycling problems because of the two-web structure. Moreover, the polyester films are more expensive than oriented polypropylene.

U.S. Pat. No. 4,456,741 discloses heat sealable terpolymer compositions useful as pressure-sensitive adhesives for use with a backing material such as paper, polyester film or foamed polymers. The terpolymer heat sealable pressure-sensitive adhesive composition comprises butyl acrylate, N-vinyl-2-pyrrolidinone and styrene. Other heat sealable coatings are disclosed in U.S. Pat. No. 3,696,082; and East German Patent No. DD-146,604.

Cold sealable pressure-sensitive adhesives have been developed. These adhesives do not require the use of a heated element to seal the packages. However, these adhesives have high surface tack characteristics making them adhere to uncoated surfaces of the packaging film which makes them difficult to use because of film blocking (i.e. sticking).

Although low blocking coating compositions with a low seal temperature (of about 71° C. (160° F.)) can be obtained with ethylene-acrylic acid copolymer coatings, such as Mobil Chemical Company film product "100 LTSC", these polymeric coatings do not have adequate machinability for use on the outside of the web and will not seal to other types of acrylic-containing coatings. Therefore, acrylic or PVDC coatings (or other machinable surface coating) must be used on the outside of the packaging film. This limits such films to "fin-seal" type applications in which the inside of the film is sealed to itself. Many applications, however, require a film structure which can be lap sealed, in which the inside surface is sealed to the outside surface.

It is apparent from this film art that there is a need for a sealable coating formulation which has the good flavor and aroma properties of acrylic and the low temperature sealability of the ethylene acrylic acid but which is not sensitive to reactive materials and which does not stick to acrylic coatings at room temperature or temperatures below about 60° C., but which seals to acrylic coatings at or above 70° C. Additionally, a film is needed which is resistant to reactive materials without containing halogenated substances and which is easy to recycle.

Sometimes the advantages of adding to the substrate materials which offer moisture and aroma barrier properties will outweigh the disadvantages which compromise the appearance and protective properties of the film and cause handling problems. Some additives incorporated into the film substrate to improve the moisture and aroma barrier properties of the film will migrate from the substrate to the surface of the film and cause various problems, depending upon the additive. Terpenes are useful moisture barrier additives and for this purpose they are often incorporated into oriented polypropylene film substrates. However, terpenes have been found to migrate through the known coatings used on oriented polypropylene substrates. This additive migration has been found to reduce the hot tack of the film, which is particularly important in the vertical form and fill sealing processes. Terpene migration has also been reported to cause flavor degradation of foods. The components of some films will impart an undesirable odor and/or flavor to foods and other products.

Thus, there is a need for a coating composition for polypropylene which is not damaged by these aggressive materials and which can block migration of terpenes and other hot melt polymers.

SUMMARY OF THE INVENTION

The invention relates to a heat sealable coating for a thermoplastic film.

An object of the invention is to provide a coating formulation which has good barrier properties, resistance to aggressive materials at high temperatures, and which inhibits aggressive materials from migrating from the substrate to the packaged product and vice-versa.

A further object of the invention is to provide a coated oriented polypropylene film which resists deformation at high temperatures and humidity and upon exposure to aggressive materials, but which does not contain halogenated materials and which need not be laminated to another film for structural integrity.

An important feature of the invention is the discovery of an acrylonitrile coating composition which blocks the migration of aggressive materials.

Another important feature of the invention is the discovery of an acrylonitrile coating composition for a packaging film which effectively prevents odor and taste degrading materials from impacting the flavor or smell of articles which are wrapped in the film without the use of a liner.

These objectives are achieved by formulating a coating for a polyolefin film, the coating comprising:

(i) more than about 25 wt. %, specifically from more than about 25 wt. % up to about 85 wt. % of a nitrile monomer having the formula:

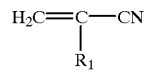

where $R_1$ is hydrogen or methyl;

(ii) from about 15 to about 75 wt. % of a monomer selected from the group consisting of 1,3-butadiene and an alkyl acrylate having the structural formula:

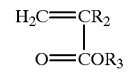

where $R_2$ is hydrogen or alkyl group containing from 1 to 4 carbon atoms and $R_3$ is an alkyl group containing from 1 to 4 carbon atoms;

(iii) from about 1 to about 10 wt. % of a monomer selected from the group consisting of an alpha or beta ethylenically unsaturated carboxylic acid or sulfoethylmethacrylate, the monomers (i) (ii) and (iii) are combined in weight percent amounts based on the total weight of the polymeric coating sufficient to achieve a glass transition temperature, specifically a calculated glass transition temperature, of at least about 10° C.

Typically, the monomer (i) is selected from the group consisting of an ethylenically unsaturated nitrile, specifically a acrylonitrile or methacrylonitrile. The monomer (ii) is selected from the group consisting of methyl acrylate, ethyl acrylate, isopropyl acrylate, propyl acrylate, butyl acrylate, isobutyl acrylate, methyl methacrylate, ethyl methacrylate, isopropyl methacrylate, propyl methacrylate, butyl methacrylate, isobutyl methacrylate, 1,3-butadiene and mixtures thereof. Typically, the monomer (iii) is selected from the group consisting of methacrylic acid, acrylic acid, itaconic acid, crotonic acid, sulfoethylmethacrylate, maleic acid and mixtures thereof.

DETAILED DESCRIPTION OF THE INVENTION

In one aspect, the invention comprises a thermoplastic substrate having a first side and a second side, the first side having a (a) coating composition comprising:

(i) more than about 25 wt. % and up to about 85 wt. % of the nitrile monomer;

(ii) from about 15 to about 75 wt. % of a monomer selected from the group consisting of the alkyl acrylate and 1,3-butadiene; and (iii) from about 1 to about 10 wt. % of a monomer selected from the group consisting of an alpha or beta ethylenically unsaturated carboxylic acid or sulfoethylmethacrylate, the monomers (i), (ii) and (iii) being combined in weight percent amounts based on the total weight of the polymeric coating sufficient to achieve a glass transition temperature, specifically a calculated glass transition temperature, of at least about 10° C.; and the second side having a metal deposited thereon or a (b) coating applied thereto comprising an acrylic-containing composition, which can be the same as, or different from, the (a) coating and is not required to contain acrylonitrile. The (a) coating is sealable to itself and to the (b) coating at temperatures ranging from about 70° C. to about 170° C.

In another embodiment, the invention relates to a heat sealable polyolefin substrate having a first surface and a second surface, the first surface having an (a) coating thereon comprising:

(i) more than about 25 wt. % to about 50 wt. % of the nitrile monomer;

(ii) from about 40 to about 75 wt. %, more specifically about 55 wt. % to about 75 wt. %, of at least one monomer selected from the group consisting of 1,3-butadiene and the alkyl acrylate; and (iii) from about 1 to about 10 wt. %, more specifically about 1 wt. % to about 6 wt. %, of at least one monomer selected from the group consisting of an alpha or beta ethylenically unsaturated carboxylic acid or sulfoethylmethacrylate, the monomers being combined in weight percent amounts based on the total weight of the polymeric coating sufficient to achieve a calculated glass transition temperature of at least about 10° C., typically ranging from about 10° C. to about 50° C., the second surface having a metal deposited thereon or a (b) coating applied thereto, the (b) coating comprising an acrylic-based composition. The (a) coating is sealable to itself and to the (b) coating at temperatures ranging from about 70° C. to about 170° C.

In a still further embodiment, the invention is directed to a heat sealable polyolefin substrate having a first surface and a second surface, the first surface having a heat sealable (a) coating comprising:

(i) more than 25 wt. % to about 50 wt. % of the nitrile monomer;

(ii) from about 40 to about 75 wt. % of at least one monomer selected from the group consisting of 1,3-butadiene and an alkyl acrylate;

(iii) from about 1 to about 10 wt. % of at least one monomer selected from the group consisting of an alpha or beta ethylenically unsaturated carboxylic acid or sulfoethylmethacrylate, the monomers being combined in weight percent amounts based on the total weight of the polymeric coating sufficient to achieve a calculated glass transition temperature ranging from about 10° C. to about 50° C., the second surface having a metal deposited thereon or a (b) coating applied thereto, the (b) coating comprising an acrylic-based coating composition comprising at least about 40 wt. % of a nitrile monomer and having a calculated $T_g$ of at least about 35° C., the (a) coating being sealable to itself and the (b) coating at temperatures ranging from about 70° C. to about 125° C.

The (b) acrylic coating composition can comprise more than about 60%, by weight of the entire coating composition, of an acrylic polymer or copolymer. Optionally, this coating can be free of acrylonitrile; in which case, the calculated $T_g$, typically, ranges from about 40° C. to about 120° C. The (b) coating can comprise a significant proportion of a monomer such as acrylic acid, methacrylic acid, ester of acrylic acid or ester of methacrylic acid. The term "acrylic coating" is a broad term which covers conventional acrylic protective film coatings mainly used for flavor and aroma barrier properties, machinability, printability and lap sealability. These acrylic coatings are described in U.S. Pat. Nos. 4,058,645 and 4,058,649 which are incorporated herein by reference in their entireties.

In a still further embodiment of the invention, the (b) acrylic coating comprises acrylonitrile and the formulation is the same or different from the (a) acrylonitrile-containing coating formulation used on the inside of the substrate. Thus, the (a) and/or the (b) coating can comprises more than about 25 to about 85 wt. %, specifically about 40 to about 70 wt. %, of at least one monomer (i) selected from the group consisting of acrylonitrile and methacrylonitrile, the coating having a calculated $T_g$ ranging from about 40, specifically, 50 to about 120° C.

The acrylic coating can be the same as the coating described in commonly assigned copending U.S. application Ser. No. 08/131,500, filed on Oct. 4, 1993.

Materials such as acrylonitrile/acrylic copolymers and/or ethylene acrylic acid copolymers can be present in the (b) acrylic coating, typically in amounts up to about 100 wt. %, more typically from at least about 40 wt. % to about 100 wt. % by weight of the acrylic monomer. If the amount of non-acrylic materials, such as acrylonitrile, exceed about 10 wt. % additional antiblocking additives may be needed. It has been found that the calculated $T_g$ of the (b) coating is usually at least about 35° C., more preferably, from about 40° C. to about 120° C., specifically about 50 to 120° C., especially when it comprises acrylonitrile.

A coating which provides good matting properties and a narrow sealing range is provided by a coating comprising a blend of acrylic-based polymer (such as Acrylic sold by Valspar) and the acrylonitrile heat seal coating of this invention. The contemplated ratio of acrylic-based polymer to acrylonitrile heat seal coating this blend varies over a wide range.

Using a high concentration of acrylonitrile in the (a) coating on the inside film surface (usually the surface which is closest to the wrapped product) produces a film having improved resistance to aggressive materials as compared to the same films containing lower concentrations of acrylonitrile. However, increasing the acrylonitrile concentration above about 50 wt. % in formulating the inside coating raises the glass transition temperature of the coating which makes the coating more brittle. When packages are formed and handled, brittle inside coatings are susceptible to a condition known as flex-cracking. Flex-cracking compromises the chemical resistance of the film. Thus, the most preferred acrylonitrile concentration for purposes of making the inside coating of this invention ranges from more than about 25 wt. % up to about 50 wt. % based on the entire weight of the (a) polymer composition. This provides a balance between chemical resistance and film flexibility.

Although the glass transition temperature is important, the desired glass transition temperature cannot be achieved by just any monomer. That is, attaining the target glass transition temperature by exceeding the contemplated concentration of, for example, the (iii) monomer results in a moisture sensitive film.

Using a coating on the outside surface (usually the surface which is farthest from the wrapped product) which has a higher $T_g$ than the coating of the inside surface provides a film with excellent qualities. Thus, the concentration of monomers which contribute to high $T_g$ values, such as acrylonitrile, can exceed 35, 40 or even 50 wt. % in the coating for the outside surface.

The invention also relates to an overwrapped article, comprising:

(1) an article; and (2) an overwrap for the article, the overwrap comprising:

(a) a heat sealable thermoplastic film comprising a substrate and film properties improving amount of a film additive, the substrate having a first side and a second side, the first side being in closer proximity to the article than the second side, the first side having a heat sealable polymeric coating composition comprising a nitrile monomer; a monomer selected from the group consisting of an alkyl acrylate; and a monomer selected from the group consisting of an alpha or beta ethylenically unsaturated carboxylic acid, the monomers being combined in weight percent amounts based on the total weight of the polymeric coating sufficient to achieve a calculated glass transition temperature of at least about 10° C.;

the second side having a coating composition comprising an acrylic containing composition.

The coating of this invention can be made by conventional emulsion polymerization processes.

The emulsion polymerized polymer formulation for making the (a) coating is, typically, prepared by a conventional emulsion polymerization process. Preferably, the polymerization is carried out in the presence of water, an emulsifying agent and a free radical catalyst. Typical free radical catalysts include hydrogen peroxide, ammonium or potassium persulfate or a redox type catalyst, such as mixtures of persulfates with alkali metal bisulfites, thiosulfates or hydrosulfites. Generally, the total amount of catalyst employed is in the range of from about 0.1% by weight to about 2% by weight based on the total weight of the monomer. The emulsion polymerization is typically carried out in the presence of one or more anionic, nonionic or cationic emulsifiers or surfactants such as, for example, an alkyl carboxylic acid salt, a phosphoric acid salt, an alkyl sulfate salt, an alkyl sulfonate salt, an alkyl aryl ether alcohol or an alkyl aryl polyether sulfate salt. A particular surfactant is sodium dodecylbenzenesulfonate. Generally, the total amount of emulsifier employed is from about 0.01 to about 2.0 percent by weight based on the total amount of water.

A chain transfer agent, such as, isooctyl thioglycolate, thioglycerol or dodecylmercaptan can be employed in the emulsion polymerization process. Usual amounts range from about 0.1 to 5% by weight based on the weight of total monomer.

The polymerization can be conducted in a redox system or in a higher temperature thermal process using a persulfate-type initiator or an azobis isobutrylnitrile initiator.

In general the polymerization is carried out at a temperature of from about 40° C. to about 100° C., preferably about 70° C. to about 90° C., at a pressure in the range of from about 0 psig (10 kPa) to about 30 psig (308 kPa). A thermal polymerization is carried out at the higher range of these temperatures typically above about 70° C. The reaction can be conducted in glassware with a reflux condenser. This stage is usually carried out in the presence of an inert gas, such as nitrogen. The polymerization is generally carried out for a time ranging from about 1 to about 8 hours, preferably about 3 to 4 hours. After completion of the polymerization reaction, the pH of the polymer can be adjusted to up to 10, more specifically, from about 6 to about 10.

The polymerization product is usually dissolved in aqueous ammonia typically by adding the polymer to the aqueous ammonia at a temperature of between about 75° C. and 85° C. which avoids coagulation or the formation of a high viscosity product. However, ammonia can be added to the polymer if agitation is adequate.

A two-stage polymerization process is also contemplated, generally the second stage polymerization is performed under the same temperature and pressure conditions as in the first stage. A preformed seed latex is made to which up to about 95% of the remaining amount of monomer feed is gradually fed in a second stage over a period of from about 2 to about 5 hours. The total reaction time of the second stage will usually range from about 4 to about 6 hours.

In one embodiment of the invention there is a two-stage polymerization in which the seed or core latex comprises up to about 50 wt. % of a different polymer such as a polymer described in U.S. Pat. No. 5,070,164. To this is added, as the remaining monomer feed, the monomer feed of this invention.

In the coating of this invention, usually, one monomer is selected from each of groups (i), (ii) and (iii) to produce a terpolymer. However, the formulation can be made from more than one monomer of each group.

A cross-linking agent may be useful. Low levels, usually less than 5 wt. %, of a cross-linking agent, such as divinylbenzene or 1,3-butylene glycol dimethacrylate or any other cross-linking agent known in the art, may also be employed, but is not required. It was found that the effect of the chain transfer agent, typically iso-octyl thioglycolate, which lowers the molecular weight can be balanced by the effect of the cross-linking agent which increases the molecular weight; therefore, when higher levels of cross-linking agent are used, higher levels of the chain transfer agent are usually used and vice versa. This helps to balance the properties of cohesive strength and sealability.

The emulsion polymers of the (a) coating have a weight average molecular weight ranging to about 150,000, preferably from about 20,000 to about 50,000 as determined by gel permeation chromatography (GPC). The foregoing can vary depending upon the comonomers used. It should be noted that the measured $T_g$ values will typically be different from the calculated $T_g$ values for acrylic polymers, typically those containing acrylonitrile.

The diameter of the polymer particles are generally in the range of from about 0.05 to about 0.3 microns, particularly for latex which is not alkali-soluble.

The glass transition temperature of acrylonitrile is about 97° C. The glass transition temperature of homopolymers from the (ii) and (iii) monomeric groups are listed in Table 1.

TABLE 1

| | Homopolymer Tg (° C.) |
|---|---|
| Second Monomer Group | |
| Methyl acrylate | 8 |
| Ethyl acrylate | −22 |
| Isopropyl acrylate | −3 |
| Butyl acrylate | −54 |
| Isobutyl acrylate | −43 |
| Third Monomer Group | |
| Acrylic acid | 106 |
| Methacrylic acid | 185 |
| Itaconic acid | — |
| Sulfoethyl methacrylate | — |
| Maleic acid | — |
| Crotonic acid | — |

In calculating the Tg of the polymer is related to the ratios of the weight fractions of the monomeric components and the Tg's of these components, so that when a terpolymer made from three monomers is being analyzed, $$\frac{1}{T_g} = \frac{W_{f1}}{T_{g1}} + \frac{W_{f2}}{T_{g2}} + \frac{W_{f3}}{T_{g3}}$$

where:

$T_g$=the $T_g$ of the terpolymer $T_{g1}$=the $T_g$ of the first monomer;

$T_{g2}$=the $T_g$ of the second monomer;

$T_{g3}$=the $T_g$ of the third monomer;

$W_{f1}$=the weight fraction of the first monomer;

$W_{f2}$=the weight fraction of the second monomer; and, $W_{f3}$=the weight fraction of the third monomer.

After drying, the resulting formulation adheres to the packaging film substrates even after exposure to moisture.

That is, the formulations retain a significant amount of their original bond strength even after immersion in water. Once solidified by drying, the (a) coated surface does not adhere to non-treated, uncoated film surfaces such as untreated polypropylene or (b) acrylic-based surface coatings. However, by conventional heat sealing techniques the coated film surface will adhere to a (b) acrylic-based surface coating.

The emulsion polymer formulations of the (a) coating are very useful for imparting high seal bond strength to packaging film substrates, particularly coated polyolefin film, such as polypropylene film substrates. Examples of substrates which may be used include cast and oriented olefin homopolymers (uniaxially or biaxially oriented), coextruded films, white opaque film (such as a film comprising oriented polypropylene containing a strata of voids). Contemplated film thicknesses for coextruded films range from about 0.5 to 1.5 mils, specifically about 0.7 to 1.25 mils. Examples of olefin homopolymers are polypropylene, and polyethylene, including high density polyethylene and linear low density polyethylene. The polyolefin substrate can have a thin layer (e.g. about 0.25 to about 2.5µ) of a non-polyolefin such as nylon or polyester (e.g. polyethyleneterephthalate and polybutyleneterephthalate). The substrate can also be cellophane. On a side of the film opposite to the (a) coating, there can be a non-acrylic material or other surface material such as a metal layer. The metal layer can be aluminum or aluminum oxide. Metal deposition can be accomplished by techniques that are well known in the film metallization art, such as vacuum deposition. Thus, the opposite side can be metallized, for example, by deposition of aluminum or other metal onto the surface of the film.

The low adhesion at temperatures below the $T_g$ of the coatings is an important feature of the invention for machinability. The coatings present a smooth, non-tacky surface which will not block to similar or different acrylic-based surface coatings under normal operating conditions. It was found that unlike other ethylene/acrylic acid coatings, the acrylonitrile coating of this invention does not block to metallized film surfaces.

It has been found that the coatings are heat sealable, but at relatively low temperatures. The surfaces, when placed in contact with each other, under pressure, and elevated temperatures, usually above the $T_g$ of the (b) coating, typically from about 70° C. up to about 170° C., will become cohesive forming a strong bond to each other. With certain polymers, such as acrylic, the bond created can be stronger than the film itself. The seal temperature required can be effected by the thickness of the composition on the substrate; that is, thicker substrates can require higher temperatures for sealability. As those skilled in the art will understand, the pressures required and seal times (time required to form a seal) will vary depending upon the temperatures. Typically, the pressures will range from about 0.5 (3.4 kPa) to about 100 psi (690 kPa) and seal time will range from a few milliseconds up to about 10 seconds.

In one specific aspect of this invention, the film substrate is primed with a material that helps to anchor the coatings. Typical primers include epoxy-type primers such as a polystyrene latex which contains at least one epoxy functionality, melamine formaldehyde or polyethyleneimine.

Known techniques can be employed for applying the (a) and (b) compositions to the substrate. For example, when impregnating or saturating the substrate, it may be dipped or sprayed. If the substrate is coated, this may be accomplished by dipping, spraying or by employing a roller, spreading knife, brush or the like. It is contemplated that, typically, the coating will be applied by direct or reverse direct gravure roll coating. Generally, for the best crimp sealability, the emulsion polymer formulation should be applied at a low level, typically, applied in an amount of from about 0.3 to 5 g/1000 sq. in., preferably about 0.5 to 1.5 g/1000 sq. in., and even more preferably from about 0.6 to about 0.7 g/1000 sq. in., to the film substrate.

The (a) and/or (b) coatings may be compounded with, or have mixed therein, other known ingredients or stabilizers, antifoaming agents, dying adjuvants, pigments, waxes, corn starch, silica, colloidal or fumed silicone, talc and the like or other compounding aids for surface modification such as those which are capable of controlling surface tack and other surface properties. Blends of any of the foregoing ingredients such as a blend of silica, wax and/or talc may be employed. Thickeners or bodying agents may be added to the polymers so as to control the viscosity of the polymer and thereby achieve the proper flow properties for the particular application desired. These particulates, typically, range in size from about 0.02 to about 10µ.

The (a) and/or (b) coating may also benefit from the inclusion of a mixture of particulates having a mean particle diameter of less than or equal to 50 nm but greater than or equal to about 2µ.

An effective amount of a coefficient of friction reducing particulate can be added to the coating composition. In general, particulates contemplated are inert, substantially spherical particulates. Specifically contemplated particulates are selected from the group of particulate cross-linked hydrocarbyl-substituted polysiloxanes; for example, the particulate cross-linked polymonoalkylsiloxanes. One example of which is a non-meltable polymonoalkylsiloxane characterized as having a mean particle size of about 0.5 to about 20 µm and a three dimensional structure of siloxane linkages. Such materials are commercially available from Toshiba Silicone Co., Ltd., worldwide and in the United States from General Electric Co. These materials are marketed under the trade name "Tospearl". A specific example of a coefficient of friction reducing particulate is "Tospearl 145". Substantially spherical glass beads and nylon particles are also contemplated. Another category of useful coefficient of friction reducing particulates includes inorganic silica such as SYLOID 162 (wax-treated surface), SYLOID 222 (high porosity), SYLOBLOCK 45 (citrate-treated surface). The quantity of particulate contemplated ranges from about 0.005 wt % to about 1 wt. %, typically, about 0.01 wt. % to about 0.1 wt. % based on the entire weight of the coating. With these particulates, films demonstrating a low coefficient of friction, good hot slip and low static are produced. The uniform sized substantially spherical particles also result in low haze which is useful when films of high clarity are desired. A particularly advantageous particulate combination includes a minor amount of the substantially spherical particulate such as "Tospearl 145" (in an amount of about 0.01 to about 0.1 wt. % by weight of the coating) and talc (in an amount of about 0.05 wt. % to about 0.5 wt. % by weight of the coating).

The coating composition of this invention provides effective barrier properties which inhibit the migration of aggressive materials to which the film is exposed either by virtue of their presence in the film itself or in the product to be packaged. Aggressive materials are those which can cause the known films to deform under appropriate temperature and humidity conditions and materials which can migrate through the known films. Specific examples of aggressive materials include the oils found in spices, synthetically or formulated scented or flavored oils, proprietary release agents added to candies to prevent them from sticking to each other and/or the packaging materials, proprietary materials used to adhere the packaging film to another film, such as a tear strip, and moisture barrier additives such as terpenes and terpene-containing materials, and oils used in some printing inks, such as McGee oil. Particularly troublesome spices include clove, anise, pepper, nutmeg and the like. Examples of synthetic or natural products which contain reactive materials include citrus air fresheners such as lemon or orange, apple or spice scented air fresheners, synthetic or naturally scented cedar blocks, cleaning products such as room deodorizers and drop-in commode cleaners and similar strongly scented or flavored products. Typically, it is desirable to wrap these products with the thermoplastic film without a protective liner. Therefore, films of this invention are desirable as they will not deform or otherwise fail upon exposure to these aggressive materials. Other contemplated aggressive materials are tobacco-derived or materials used to fabricate or flavor tobacco products such as menthol.

The aggressive materials even when not added to the film during manufacture, can deform the film by virtue of their presence in the packaged product. The aggressive material will be able to contact the inside of the film even when separated by a permeable liner so that the film is not directly in contact with the product.

As mentioned above, one of the advantages of this invention is the discovery that the acrylonitrile-containing coating prevents problems posed by terpenes which are often employed for film moisture barrier enhancing properties.

Terpene hydrocarbons are generally described in *System of Nomenclature for Terpene Hydrocarbons, Acyclics Monocyclics and Bicyclics* (American Chemical Society, 1955), p.p. 3. Terpene hydrocarbons contemplated include not only $C_{10}H_{16}$ hydrocarbons but also their hydrogenated derivatives and other hydrocarbons possessing similar fundamental chemical structures. They may be acyclic or cyclic, simple or complex and found in naturally occurring substances or manufactured synthetically. Many of the o carbon skeletons of terpene hydrocarbons consist of multiples of the isoprene nucleus, $C_5H_8$. The cyclic terpene hydrocarbons can be classified as monocyclic, bicyclic or tricyclic. Sesquiterpenes $C_{15}H_{24}$ and polyterpenes $(C_5H_8)_x$ may even fall within the broad classification of terpenes. Also contemplated are oxygenated and hydrogenated derivatives and other types of derivatives. The terpene polymers can be produced by polymerization and/or copolymerization of terpene hydrocarbons such as the monocyclic and bicyclic monoterpenes and their mixtures, including allo-ocimene, carene, isomerized pinene, pinene, dipentene, terpinene, terinolene, limonene, turpentine, a terpene cut or fraction and various other terpenes. The polymerization and/or copolymerization may be followed by hydrogenation under pressure. Preferred terpene polymers are those selected from the group consisting of polymerized d-limonene, polymerized beta pinene, or a polymerized synthetic approximation of d-limonene and beta-pinene and mixtures thereof, Typically, the polyterpenes contemplated have a molecular weight of from about 800 to about 15,000 $M_n$.

EXAMPLES OF THE INVENTION

In the following examples, the measured glass transition temperature (Tg) was determined using a differential scanning calorimeter (DSC) (Perkin Elmer 7 Series Thermal Analysis System). A thin film of the polymer was formed on a glass plate and dried by heating to about 110° C. for about 1 minute. The sample was then placed in the DSC according to equipment instructions and heated at a rate of 10° C. per minute under a nitrogen atmosphere up to about 50° C. higher than the anticipated Tg (to convert the polymer to an amorphous state). The sample was cooled at a rate of 10° C. per minute to a temperature of about 50° C. below the anticipated Tg (if possible). Another heat cycle was followed in which the temperature was raised at a rate of 10° C. per minute up to about 50° C. beyond the anticipated Tg. During this cycle a heat absorption peak was produced. The Tg was the temperature at a midpoint (inflection) of the transition region. See *Polymer Handbook*, 3rd Edition, Brandt et al., John Wiley & Sons, 1989 (pp. VI/210–VI/211). The value of the measured Tg can vary depending upon the instruments employed and the sample preparation. It is important to note that often the measured Tg differs from the calculated value. The difference between these two values can be significant, for example, greater than about 10° C.

EXAMPLE 1

This example illustrates preparation of an emulsion-polymerized, nitrile-containing acrylic terpolymer formulation which is useful as an inside coating.

Using a semi-continuous batch process, a latex was prepared by continuously adding and metering 2412 grams of the total monomer feed over a period of 2.5 hours to a reactor containing 2900 grams of water, 6 grams of 30% sodium lauryl sulfate, as an emulsifier, and 72 grams of freshly prepared 10% aqueous ammonium persulfate, a free-radical catalyst. The premixed total monomer feed contained 59.7% (1440 grams) ethyl acrylate, 36.8% (888 grams) acrylonitrile, 3% (72 grams) acrylic acid, and 0.5% (12 grams) iso-octyl thioglycolate (as a chain-transfer agent). A feed containing 12.4 grams of sodium dodecyl-benzenesulfonate dissolved in 1000 grams water was added over a 3.0-hour period. The emulsion polymerization reaction was maintained at 80±5° C. in a jacketed, glass-lined pressure vessel made by Pfaudler which has a capacity of about 3 gallons. The agitation was set at 150 rpm. After addition of all the feeds, approximately 2450 grams of water were used to flush the various tanks and feed lines and to reduce the solids content of the emulsion. The diluted emulsion was held at 80±5° C. for one hour after the flushes were added, then 120 grams of 30% aqueous ammonia, diluted to a total of 2250 grams with deionized water, were added to the emulsion. The mixture was held at 80±5° C. for an additional hour, then cooled.

EXAMPLE 2

In making the acrylonitrile coating of this Example, substantially the same process as Example 1 was followed except the monomer composition was: 68.6% (1656 grams) methyl acrylate, 27.9% (672 grams) acrylonitrile, 3% (72 grams) acrylic acid, and 0.5% (12 grams) iso-octyl thioglycolate.

The following table sets forth the properties of each polymer latex of the above Examples 1 and 2.

TABLE 2

Characterization of Polymer Coatings

| Latex Properties | Example 1 | Example 2 |
|---|---|---|
| Total Solids (%) | 21.7 | 21.6 |
| Alkali solubility | Partially Soluble | Soluble |

TABLE 2-continued

Characterization of Polymer Coatings

| Latex Properties | Example 1 | Example 2 |
|---|---|---|
| pH | 9.5 | 9.0 |
| $T_q$ [calculated] (° C.) | 16 | 31 |
| $T_q$ [measured] (° C.) | 40 | 50 |
| Residual acrylonitrile, ppm | 10 | 12 |

EXAMPLE 3

This example describes the preparation of coated films.

An 80-gauge polypropylene film was coated on the outside with an acrylic coating containing 100 parts of a polymer made from methyl acrylate, methylmethacrylate and methacrylic acid. The $T_g$ of the terpolymer was about 55° C. The coating composition also contained 40 parts colloidal silica, 0.5 parts talc and 8.5 parts carnauba wax. The film was primed with polyethyleneimine (any suitable primer would be acceptable) and the coating was applied with a reverse direct gravure and dried at 104° C.

The inside of the same film was primed then coated with the nitrile containing coatings of Examples 1 and 2. The inside coating compositions also contained 4 parts carnauba wax and 0.4 parts talc. Film 1 was coated with the terpolymer of Example 1. Film 2 was coated with the terpolymer of Example 2.

COMPARATIVE EXAMPLE 4

For purposes of comparison, a film was made by the same procedure as Example 3 but it was coated on both sides with a terpolymer of methyl acrylate, methylmethacrylate and methacrylic acid. The film of this example is designated Film 3.

Experimental Results

EXAMPLE 5

Fifty bags were formed from films made in accordance with the above examples. The bags were loaded with four ounces of "GUMMY BEARS" supplied by Hershey on a Mirapac vertical form fill and seal machine. The bags were exposed to temperatures of 85° F. (29° C.) and 80% relative humidity for 30 days to determine their ability to resist prolonged periods of high temperatures and high humidity and exposure to contact with aggressive materials contained in the candy.

The results reported in the following table demonstrate that a temperature and humidity resistant film is obtained at higher levels of acrylonitrile and low $T_g$. Film puckering was evaluated by measuring the percentage of packages containing pocks which was determined by visually inspecting the packages and counting the number of packages that contained pocks or puckers.

TABLE 3

| Film | COATING | MONOMER RATIO | $T_g$ (° C.)* | $T_g$ (° C.)** | % POCKED PACKAGES | OBSERVATIONS |
|---|---|---|---|---|---|---|
| Film 1 | EA/ACN/AA | 60/37/3 | 16 | 40[b] | 2 | excellent, puckering confined to small areas of incomplete coating |
| Film 2 | MA/ACN/AA | 69/28/3 | 31 | 50[a] | 36 | acceptable, minor puckering |
| Film 3 | MA/MMA/MAA | 51.5/44.5/4 | 57 | 55 | 100 | unacceptable, severe puckering within 3 days |

*theoretical glass transition temperature
**measured glass transition temperature
MA = methyl acrylate
MMA = methylmethacrylate
MAA = methacrylic acid
ACN = acrylonitrile
AA = acrylic acid
EA = ethyl acrylate
[a] = The glass transition temperature was partially obscured by a melting transition which peaked at about 54° C.
[b] The glass transition temperature was partially obscured by a melting transition which peaked at about 46° C.

As noted in Table 1, in Film 1, which was coated with an EA/ACN/AA terpolymer containing 37 wt. % ACN, package deformation because of puckering was limited to small areas in which there was a skip in the coating (an area of incomplete coating or a defect in the coating). Where there was a skip in the coating, the region inside the skip was severely puckered but the puckering did not propagate underneath areas which were fully coated. This lack of propagation was unexpected. Film 3 which was coated with MA/MMA/MAA and contained no ACN was seriously puckered. Comparing Film 1 with Film 2, which both contained ACN, Film 1 which contained more ACN (37 wt % vs. 28 wt. %) and which had a lower $T_g$, than Film 2 has more resistance to puckering.

EXAMPLE 6

The films were also tested for protection against the reactive oils contained in ground black pepper, ground nutmeg, ground cloves and various air fresheners such as apple air freshener, orange air freshener and cedar wood blocks.

Films 1, 2 and 3 were used to make hand formed packages which contained a variety of materials containing aggressive oils. It was found that the nitrile-containing coatings offer improved protection to a broad range of materials even after 1 month of conditioning at 75 to 85° F. (24° C. to 29° C.) and ambient humidity and 3 days at 85° F. (29° C.) and 80% relative humidity.

Film puckering was given a rating from 0 to 5 based upon visual observation. The ratings were as follows:

0=Unaffected
1=One or two small dimples (pass)
2=A few isolated dimples (marginal)
3=Several dimples and a few dents (fail)
4=Heavy dimples and some dents (fail)
5=Heavy dimples and heavy dents (fail)

The results of the test are reported in the following table.

TABLE 4

Film Puckering Test Results

| Spice | Film 1 | Film 2 | Film 3 |
| --- | --- | --- | --- |
| Ground Nutmeg | 3 | 0.3 | 5 |
| Ground Black Pepper | 0 | 0.5 | 5 |
| Ground Clove | 0* | 0* | 5 |

*The spice appeared to have interaction with the coating even though the package was substantially unaffected by the spice.

Film packages made from the Films 1, 2 and 3 were filled with apple air freshener, orange air freshener and cedar blocks. The packages were conditioned at 75–85° F. (24° C.–29° C.) and ambient humidity for 7–8 weeks. The appearance of the films is reported in the following Table 5.

TABLE 5

Film Puckering

| Spice | Film 1 | Film 2 | Film 3 |
| --- | --- | --- | --- |
| Apple Air Freshener | 0 | 3 | 2 |
| Orange Air Freshener | 0 | 2 | 1 |
| Cedar Blocks | 0 | 0.5 | 1 |

EXAMPLE 7

The films were tested for sealability properties.

Hot Tack Test

Hot tack was evaluated to determine whether Films 1 and 2 would run on high speed packaging equipment. In the hot tack test a film specimen is placed over a spring and bent into a "U" shape with the sealing surfaces placed together. The spring ends are closed and the sealing surfaces are placed into the jaws of a crimp sealer to make a seal. While the sealing pins are closed the spring tension is released. The amount of tension (g/in) needed to pull the seals apart is the hot tack value. A hot tack value of >150 g/in for Films 1 and 2 was demonstrated over a temperature ranging from between 160° F. and 240OF (71° C. and 115° C.).

Crimp Seal Strength Test

Crimp seal strength was evaluated by inserting the test film squarely between the jaws of a "WRAP-ADE" crimp sealer so that the transverse direction of the film was parallel to the jaws. The seal was formed and then tested by pulling the sealing surfaces away from each other. Seal strengths exceeded 200 g/in for both Films 1 and 2.

Minimum Seal Temperature Test

The minimum seal temperature of Films 1 and 2 was tested using a multiple bar sealer using an "ASKCO" heat sealer. A film specimen was placed over the sealer's "Teflon" pad. The surfaces to be sealed were placed together (inside/inside or outside/outside). The films were inserted into the sealer. After the seal formed, the free ends were each placed in the clamp of a Suter Tester and pulled away from each other. The minimum seal temperature for Film 1 was about 160° F. (71° C.) and the minimum seal temperature for Film 2 was about 215° F. (122° C.).

EXAMPLE 8

In this example, a coating made with over 50 wt. % acrylonitrile is described.

In making the acrylonitrile coating used in this Example, the same procedure as Example 1 was followed except the monomer composition was 35.6% methyl acrylate, 58.4% acrylonitrile, 5% acrylic acid and 1% iso-octyl thioglycolate. The latex of this example was alkali soluble, had a total solids content of 20.9, a pH of 9.8, a calculated $T_g$ of 57° C. and a residual acrylonitrile content of 9 ppm.

The monomer coating was coated to the surface of a primed 92 gauge biaxially oriented polypropylene substrate in a coating weight of approximately 0.5 g/1000 square inches as described in Example 3. The film was designated Film 4.

The oxygen transmission rate at 30° C. was 30 cc/100 square inches/day. The minimum seal temperature ranged from about 215° F.–230° F. (101–110° C.).

For comparative purposes the oxygen barrier properties of Film 3 were tested. The oxygen barrier properties of Film 3 under the same conditions was 120 cc/100 square inches/day. Comparing Film 4 with Film 3, both accepted water and solved-based printing inks well, yet, Film 4 had a much lower propensity for picking ink from another printed surface, as compared to Film 3.

EXAMPLE 9

This example describes the performance of a variety of outside formulations.

Oriented polypropylene film samples were prepared substantially as described in Example 3.

To make outside coatings used in the films of this example, coating formulations were prepared substantially as described in Example 1, except that different monomer proportions were used. The final formulation of each coating contained 0.5 parts per hundred parts monomer (phr) talc, 40 phr silica and 5 phr wax.

The inside coating used on each film was prepared substantially as described in Example 1 and contained 68 wt. % methacrylic acid, 27 wt. % acrylonitrile and 5 wt. % acrylic acid. The calculated $T_g$ was 31° C.

The coating weights ranged from about 0.55 to about 0.60 g/msi.

The monomers and monomer content of the outside coating used on each film is reported in the following table.

TABLE 6

| Film No. | Monomers | Ratio | $T_g$ °C. (calc) |
|---|---|---|---|
| 5 | MA/MMA/ACN/AA | 40/10/45/5 | 57 |
| 6 | MA/MMA/ACN/MAA | 40/10/45/5 | 59 |
| 7 | MMA/MA/MAA | 60/35/5 | 66 |

The measured $T_g$ of Film No. 5 was 149° F. (65° C.) while the measured $T_g$ of Film No. 6 was 136° F. (58° C.).

In the following Table 7, the hot slip, blocking and seal strength of Films 5, 6 and 7 are reported.

Seal Strength

Seal strength was tested by contacting the outside coatings to the inside coating and forming a seal at 210° F. (99° C.), 2 second dwell time and 5 psi (34 kPa) in an ASKO sealer then testing seal strength by measuring the force (g/in) required to pull the sealed films apart in an Instron testing machine.

Blocking

Blocking was measured by contacting the inside coatings in a laboratory press maintained at 140° F. (60° C.), 750 psi (5,171 kPa) for 72 hours. The force required to separate the films is determined by measuring the force (g/in) needed to pull the films apart in the Instron testing machine.

Hot Slip

Hot slip is a test for machinability. Hot slip performance was evaluated by passing a sample of the coated film over an aluminum platen heated to a temperature of about 127° C. at a rate of 45 in/min. The hot slip value is a dimensionless number provided by the hot slip test machine.

TABLE 7

| Film No. | Hot Slip | Blocking (g/in) | Seal Strength (g/in) |
|---|---|---|---|
| 5 | 0.65 | 9.1 | 410 |
| 6 | 0.64 | 9.8 | 510 |
| 7 | 0.54 | 3.6 | 305 |

EXAMPLE 10

This example demonstrates that films coated with the coating of this invention are resistant to the aggressive materials found in release agent coatings for chewy candies. Release agent coatings are used to prevent chewy candies from sticking together, but they have been known to deform oriented polypropylene packaging films. The data reported in the following Table 8 show that coatings containing acrylonitrile, as disclosed herein, prevent oriented polypropylene film packages from being damaged by these release agent coatings. The data also show that coatings which contain less than 25 wt. % acrylonitrile based on the entire weight of the terpolymer do not prevent package deformation as effectively.

Test packages were hand-formed from oriented polypropylene film coated with various coating formulations by known techniques. The coatings used in Films 8 to 13 were prepared in accordance with the procedure described in Example 1. The coating of Film 14 was prepared in accordance with the procedure described in U.S. Pat. No. 5,040,164. In the test, two packages were prepared for each sample.

The packages were filled with "GUMMY BEAR" candies and exposed to temperature conditions of 85° F. and 80% relative humidity for 30 days. The films were visually inspected and given a rating a 0–5, as defined in Example 6. A passing rating was ≦1. A separate rating for each package is reported in the Table.

TABLE 8

Film Resistance to Release Agents on Chewy Candies

| Film | Coating | Monomer Ratio | $T_g$* ° F. (° C.) | Ratings |
|---|---|---|---|---|
| 8 | EA/ACN/AA | 46/51/3 | 88 (31) | 4,5 |
| 9 | MA/ACN/AA | 36/59/5 | 135 (57) | 1,5 |
| 10 | EA/ACN/AA | 60/37/3 | 60 (16) | 0,0 |
| 11 | EA/ACN/AA | 60/35/5 | 60 (16) | 0,0 |
| 12 | MA/ACN/AA | 92/5/3 | 60 (16) | 3,2 |
| 13 | MA/ACN/AA | 68/27/5 | 88 (31) | 0.5,0.5 |
| 14 | MA/MMA/MAA | 51.5/44.5/4 | 135 (57) | 5,5 |

*Theoretical Value

The data in Table 8 show that packages coated with the coating composition of the present invention were resistant to the release agents coated onto "GUMMY BEAR" candies. Acrylonitrile-containing coatings having a glass transition temperature within the range of 10° C. to less than 50° C. and containing acrylonitrile in an amount of greater than 25 wt. % but less than 50 wt. %, based on the total weight of the terpolymer, achieved a rating of less than 1. In contrast, coatings with a glass transition temperature of greater than 50° C. and either less than 25 wt. % or more than 50 wt. % acrylonitrile achieved unacceptable ratings (compare Films 8–9, 12 and 14 with Films 10–11 and 13). Comparing Films 12 and 14, it is apparent that although the presence of acrylonitrile enhanced resistance to the release agents, the results were unacceptable because the amount of acrylonitrile was too low. In Film 9, a relatively good rating of 1 was achieved; however, it was observed that any significant flexing of the package (which would occur during normal handling) caused the package to fail the test.

EXAMPLE 11

This example illustrates preparation of an emulsion polymerized nitrile-containing heat seal coating formulation of this invention.

A 10 L reactor was charged with 3529 g deionized water and 13.0 g of 10% sodium dodecylbenzenesulfonate (diluted Maranil A75). While sweeping the charge with nitrogen the batch was heated to 80° C.

In a separate vessel, a surfactant/catalyst solution was prepared from 345 g 10% sodium dodecylbenzenesulfonate, 655 g deionized water and 4.14 g ammonium persulfate. The ammonium persulfate was added to the solution with sufficient time to permit it to dissolve completely.

In another vessel a monomer feed containing 49.9% methylmethacrylate, 44.9% acrylonitrile and 5% methacrylic acid was prepared from 1380 g methylmethacrylate, 1242 g acrylonitrile, 138 g methacrylic acid, 27.6 g isooctyl thioglycolate and 50 g deionized water.

A prepared catalyst solution of 41.4 g 10% ammonium persulfate and 100 g deionized water was added to the 10 L reactor. After 2 to 5 minutes, addition of the monomer feed commenced. The monomer feed was added at a constant rate over a period of at least 2.5 hours but within 4 hours. Addition of the surfactant/catalyst solution commenced after about 10%. After completing addition of the monomer feed there was about 5–10% surfactant/catalyst solution remaining. The remaining surfactant catalyst solution was added over a period of 15 to 30 minutes.

Thereafter, the reactor was held at 80° C. for about 30 minutes. During this time the reactor was flushed with 4000 g deionized water.

A solution of aqueous ammonia was prepared by mixing 200 g 30% aqueous ammonia and 800 g deionized water. The aqueous ammonia was heated to a temperature of about 80° C. The polymerization product was dissolved in the aqueous ammonia, with agitation, while keeping the temperature above 75° C. The agitation speed can be increased while adding the polymer. About 5 minutes after all the polymer was added, the agitation speed was decreased. Agitation was discontinued and the latex was held at 80° C. for one hour and then allowed to cool. The final solids content of the batch was about 22–23% and the pH was about 9.0. The $T_g$ calculated was 105° C. but the measured $T_g$ was about 62 to 71° C.

EXAMPLE 12

This example compared the performance of various particulates in the acrylonitrile coatings of this invention.

To three coating formulations prepared as described in Example 11 were added Syloid 222, Syloid 162 (both sold by Grace) and TOSPEARL 145 (4.5μ mean particle diameter, as determined by scanning electron micrograph, sold by General Electric Company). The amount of Syloid 222 was 0.053 phr (parts per hundred parts coating). The amount of Syloid 162 and TOSPEARL was 0.07 phr. A lower weight % of Syloid 222 was used because of its lower particle density. Therefore, all three candidates had about the same number of particles/unit area in this example.

The coatings were applied to the surface of a primed oriented polypropylene film as described in Example 3. In this example the primer was polyethyleneimine. The acrylonitrile-containing coatings were applied to the primed surface to a coating weight of about 0.6 to 0.7 g/1000 square inches. The coefficient of friction, hot slip and static performance of the three coatings was evaluated.

Hot slip was evaluated following the above-described test procedure.

Coefficient of Friction Performance

Coefficient of friction is generally used as an index of the slip behavior of plastic film. In this test the outside coating-to-outside coating friction behavior of the films were tested. The test was performed on a Slip/Peel Tester Model #SP-101 with a 100 g (±4 g) sled. The test unit was set to an averaging time of ten seconds, the meter was set to instantaneous and the balance knob was set so that the meter read out was on zero. Samples were placed in the tester so that the outside surface coatings on each sample were contacting each other and the test was started by pressing the start button. The meter was observed and the point where the meter read out stopped was recorded as the measured coefficient of friction. Note that points where the meter merely hesitated slightly, but did not stop, were not recorded as a measurement of the coefficient of friction. The unit of measurement is dimensionless.

Antistatic Performance

The antistatic performance was evaluated to determine evenness of charge distribution over the surface of the film. This test provides information on dust attraction; that is, whether there is an even charge over the film surface which permits a nonproblematic even coating of dust or an uneven charge which permits a problematic uneven coating of dust.

The antistatic performance was tested using an isoprobe which measured the voltage above the film surface and a chart recorder which plotted the measurement provided by the voltmeter. The test was conducted under ambient conditions of temperature and pressure. The voltmeter was warmed-up on standby mode for twenty minutes. The voltmeter was set to zero. The coated surface of the film sample was placed on the isoprobe table, coated side up. The voltmeter was passed about 3 to 4 mm above the surface of the film and it conveyed the voltage measurement to the chart recorder. The antistatic performance was determined from the resulting plot. The distance from the minimum to maximum peaks were measured in centimeters and multiplied by eight. A low value corresponds to good antistat performance.

The results of the tests are set forth in the following Table 9.

TABLE 9

| Particulate | Coefficient of Friction | Hot Slip | Static |
| --- | --- | --- | --- |
| 162 | 0.21 | 0.56 | 29.6 |
| 222 | 0.26 | 0.86 | 56.8 |
| TOSPEARL | 0.20 | 0.55 | 19.2 |

The data reported in Table 9 show that TOSPEARL outperformed the other particulates in coefficient of friction, hot slip and anti-static performance.

What is claimed is:

1. A heat sealable polyolefin film comprising a polyolefin substrate having a first side and a second side, the first side having a polymeric coating I, comprising a polymerization product of:

(i) about 25 wt. % to about 85 wt. % of a nitrile monomer having the formula:

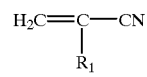

where $R_1$ is hydrogen or methyl;

(ii) about 15 wt. % to about 75 wt. % of at least one monomer selected from the group consisting of 1,3-butadiene and an alkyl acrylate having the structural formula:

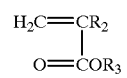

where $R_2$ is hydrogen or an alkyl group containing from 1 to 4 carbon atoms and $R_3$ is an alkyl group containing from 1 to 10 carbon atoms;

(iii) about 1 wt. % to about 10 wt. % of at least one monomer selected from the group consisting of an alpha or beta ethylenically unsaturated carboxylic acid and sulfoethylmethacrylate;

wherein the percent amounts of the monomers (i), (ii), and (iii) are based on the total weight of the polymerization product and said polymerization product has a calculated glass transition temperature of at least about 10°

C., the second side of the polyolefin substrate having a metal deposited thereon or a polymer coating II applied thereto, the polymer coating II comprising an acrylic coating composition, the polymer coating I being sealable to itself and to the polymer coating II at temperatures ranging from about 70° C. to about 170° C., wherein the polymer coating I and/or the polymer coating II further comprises substantially spherical particulates selected from the group consisting of silica and cross-linked polymonoalkylsiloxanes, said substantially spherical particulates being a blend of particulates having a mean particle diameter less than or equal to 50 nm and particulates having a mean particle diameter greater than or equal to 2 μm.

2. The heat sealable film as described in claim 1 in which the polymers of polymer coating I and/or polymer coating II comprise more than about 25 to about 85 wt. % of at least one monomer (i) selected from the group consisting of acrylonitrile and methacrylonitrile, the coating I and/or II having a calculated $T_g$ ranging from about 50 to about 120° C.

3. The heat sealable film as described in claim 1 in which the polymer coating I and/or polymer coating II further comprises a surface modifying agent.

4. The heat sealable film as described in claim 1 in which the polymer of polymer coating II comprises at least one monomer selected from the group consisting of acrylic acid, methacrylic acid, ester of acrylic acid and ester of methacrylic acid.

5. The heat sealable film of claim 4 in which the polymer of polymer coating II is free of acrylonitrile and has a calculated $T_g$ of about 40° C. to about 120° C.

6. The heat sealable film of claim 1 in which the (ii) alkyl acrylate monomer is at least one monomer selected from the group consisting of methyl acrylate, ethyl acrylate, isopropyl acrylate, propyl acrylate, butyl acrylate, isobutyl acrylate, methyl methacrylate, ethyl methacrylate, isopropyl methacrylate, propyl methacrylate, butyl methacrylate, isobutyl methacrylate and mixtures thereof.

7. The heat sealable film of claim 1 in which the (iii) carboxylic acid monomer is at least one monomer selected from the group consisting of methacrylic acid, acrylic acid, itaconic acid, crotonic acid, sulfoethyl methacrylate, maleic acid and mixtures thereof.

8. The heat sealable film of claim 1 in which the polymer of polymer coating I and/or polymer coating II comprises about 40 wt. % to about 70 wt. % of at least one monomer (i) selected from the group consisting of acrylonitrile and methacrylonitrile, the coating I and/or II having a calculated $T_g$ ranging from about 50° C. to about 120° C.

9. The heat sealable film of claim 3 in which polymer coating I and/or polymer coating II further comprises a particulate selected from the group consisting of wax, talc, and blends thereof.

10. The heat sealable film of claim 1 in which the metal is on the second side and it is aluminum or an oxide of aluminum.

11. The heat sealable film of claim 1 which further comprises a primer layer located between polymer coating I and the first side of the substrate and/or between polymer coating II and the second side of the substrate.

12. A heat sealable polyolefin film comprising a polyolefin substrate having a first surface and a second surface, the first surface having a heat sealable polymeric coating I, comprising a polymerization product of:

(i) about 25 wt. % to about 50 wt. % of a nitrile monomer having the formula:

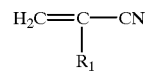

where $R_1$ is hydrogen or methyl;

(ii) about 40 wt. % to about 75 wt. % of at least one monomer selected from the group consisting of 1,3-butadiene and an alkyl acrylate having the structural formula:

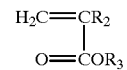

where $R_2$ is hydrogen or an alkyl group containing from 1 to 4 carbon atoms and $R_3$ is an alkyl group containing from 1 to 10 carbon atoms; and (iii) about 1 wt. % to about 10 wt. % of at least one monomer selected from the group consisting of an alpha or beta ethylenically unsaturated carboxylic acid and sulfoethylmethacrylate;

wherein the percent amounts of the monomers (i), (ii), and (iii) are based on the total weight of the polymerization product and said polymerization product has a calculated glass transition temperature ranging from about 10° C. to about 50° C., the second surface of the polyolefin substrate having a metal deposited thereon or a polymer coating II applied thereto, the polymer coating II comprising an acrylic coating composition, the polymer coating I being sealable to itself and to the polymer coating II at temperatures ranging from about 70° C. to about 125° C., wherein the polymer coating I and/or the polymer coating II further comprises substantially spherical particulates selected from the group consisting of silica and cross-linked polymonoalkylsiloxanes, said substantially spherical particulates being a blend of particulates having a mean particle diameter less than or equal to 50 nm and particulates having a mean particle diameter greater than or equal to 2 μm.

13. The heat sealable film as described in claim 12 in which polymer of the coating I comprises at least one monomer (i) selected from the group consisting of acrylonitrile and methacrylonitrile; at least one monomer (ii) selected from the group consisting of methyl acrylate, ethyl acrylate, methyl methacrylate, ethyl methacrylate, isopropyl methacrylate, propyl methacrylate, butyl methacrylate and isobutyl methacrylate; and at least one monomer (iii) selected from the group consisting of acrylic acid, methacrylic acid, itaconic acid and sulfoethyl methacrylate.

14. The heat sealable film as described in claim 12 in which polymer of the coating II further comprises 25 to about 85 wt. % of at least one monomer (i) selected from the group consisting of acrylonitrile and methacrylonitrile the coating having a calculated $T_g$ ranging from about 40 to about 120° C.

15. The heat sealable film as described in claim 14 in which polymer coating I and/or polymer coating II further comprises a surface modifying agent.

16. The heat sealable film as described in claim 12 in which polymer of the coating II comprises at least one monomer selected from the group consisting of acrylic acid, methacrylic acid, ester of acrylic acid and methacrylic acid.

17. The heat sealable film of claim 16 in which polymer of the coating II is free of acrylonitrile and has a calculated $T_g$ ranging from about 40° C. to about 120° C.

18. The heat sealable film of claim 15 in which polymer coating I and/or polymer coating II further comprises a particulate selected from the group consisting of talc, wax and blends thereof.

19. The heat sealable film of claim 12 in which the metal is on the second side and it is aluminum or oxide of aluminum.

20. The heat sealable film of claim 12 in which there is an aggressive material in contact with polymer coating I and/or polymer coating II, the aggressive material being a terpene, vegetable oil, mineral oil, synthetic oil, tobacco product and/or material used to fabricate or flavor a tobacco product.

21. The heat sealable film of claim 14 which further comprises a primer layer located between polymer coating I and the first surface of the substrate and/or between polymer coating II and the second surface of the substrate.

22. A heat sealable film comprising a polyolefin substrate having a first surface and a second surface, the first surface having a heat sealable polymeric coating I, comprising a polymerization product of:

(i) about 25 wt. % to about 50 wt. % of a nitrile monomer having the formula:

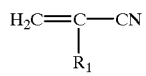

where $R_1$ is hydrogen or methyl;

(ii) about 40 wt. % to about 75 wt. % of at least one monomer selected from the group consisting of 1,3-butadiene and an alkyl acrylate having the structural formula:

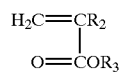

where $R_2$ is hydrogen or an alkyl group containing from 1 to 4 carbon atoms and $R_3$ is an alkyl group containing from 1 to 10 carbon atoms; and (iii) about 1 wt. % to about 10 wt. % of at least one monomer selected from the group consisting of an alpha or beta ethylenically unsaturated carboxylic acid and sulfoethylmethacrylate;

wherein the percent amounts of the monomers (i), (ii), and (iii) are based on the total weight of the polymerization product and said polymerization product has a calculated glass transition temperature ($T_g$) ranging from about 10° C. to about 50° C., the second surface of the polyolefin substrate having a metal deposited thereon or a polymer coating II applied thereto, the polymer coating II comprising an acrylic coating composition comprising at least about 40 wt. % of a nitrile monomer having the formula:

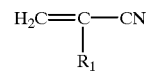

where $R_1$ is hydrogen or methyl, the polymer coating having a calculated $T_g$ of at least about 35° C., the polymer coating I being sealable to itself and to the polymer coating II at temperatures ranging from about 70° C. to about 125° C., wherein the polymer coating I and/or the polymer coating II further comprises substantially spherical particulates selected from the group consisting of silica and cross-linked polymonoalkylsiloxanes, said substantially spherical particulates being a blend of particulates having a mean particle diameter less than or equal to 50 nm and particulates having a mean particle diameter greater than or equal to 2 μm.

23. The heat sealable film as described in claim 22 in which polymer of the coating I comprises at least one monomer (i) selected from the group consisting of acrylonitrile and methacrylonitrile; at least one monomer (ii) selected from the group consisting of methyl acrylate, ethyl acrylate and methyl methacrylate and at least one monomer (iii) selected from the group consisting of acrylic acid, methacrylic acid itaconic acid and sulfoethyl methacrylate.

24. The heat sealable film as described in claim 23 in which polymer of the coating II comprises at least one nitrile monomer selected from the group consisting of acrylonitrile or methacrylonitrile.

25. The heat sealable film as described in claim 23 in which polymer of the coating II further comprises from about 40 wt. % to about 70 wt. % of at least one monomer (ii) which is selected from the group consisting of methyl acrylate and methyl methacrylate, and about 1 wt. % to about 10 wt. % of at least one monomer (iii) selected from the group consisting of acrylic acid, methacrylic acid, itaconic acid and sulfoethyl methacrylate.

26. The heat sealable film as described in claim 22 in which polymer coating I and/or polymer coating II further comprises a particulate selected from the group consisting of wax, talc and blends thereof.

27. The heat sealable film of claim 22 in which there is an aggressive material in contact with polymer coating I and/or polymer coating II.

28. The heat sealable film of claim 27 in which the aggressive material is selected from the group consisting of terpenes, vegetable oils, mineral oils, synthetic oils, tobacco-derived materials and materials used in fabricating or flavoring tobacco products.

29. The heat sealable film of claim 22 in which the metal is on the second side and it is aluminum or oxide of aluminum.

30. The heat sealable film of claim 22 which further comprises a primer layer located between polymer coating I and the first surface and/or between polymer coating II and the second surface.

* * * * *